Patented July 15, 1930

1,770,635

UNITED STATES PATENT OFFICE

IAN C. SOMERVILLE, OF CHELTENHAM, PENNSYLVANIA, ASSIGNOR TO RÖHM & HAAS COMPANY, A CORPORATION OF DELAWARE

CONDENSED AROMATIC SULPHONIC ACIDS AND PROCESS OF MAKING SAME

No Drawing.    Application filed April 7, 1928.  Serial No. 268,376.

This invention relates to new materials which have the property of converting raw pelt into leather and which also possess a natural affinity for basic dyestuffs.

These new compounds consist of condensed sulphonic acids of aromatic hydrocarbons formed by condensing the sulfonated hydrocarbons under mild conditions with furfuraldehyde. Under aromatic hydrocarbons I include benzene and naphthalene and their alkyl substituted derivatives.

The invention is illustrated by the following examples but is not confined to these examples.

Example #1

128 grams naphthalene, 128 grams sulfuric acid (100%) are heated together at 130° C. for 6 hours with constant stirring. The mass is cooled and 180 grams of water, added. When the temperature is lowered to 25° C. 48 grams of furfuraldehyde are slowly added over a period of one hour while the temperature is held around 25° C.

The reaction mixture is stirred intermittently at 25° C. for a further period of 48 hours.

The resulting product may be purified as in Example #2 or may be neutralized with milk of lime and filtered to remove the excess sulfuric acid as the calcium salt. The filtrate contains the calcium salt of the new material. This solution is then acidified with sulfuric acid to liberate the new material, the calcium sulfate formed being filtered off.

Example #2

128 grams naphthalene, 150 grams sulfuric acid (66° Bé.) are heated together for two hours at 160° C. with constant stirring. The mass is then cooled to 120° C. and a mixture of 128 grams isopropyl alcohol, 88 grams sulfuric acid (66° Bé.) is slowly run in over a period of 1½ to 2 hours while the temperature is held at 120° C. with constant stirring. A further period of 3 hours at 120° C. constant stirring completes the alkylation of the naphthalene sulphonic acid, where upon the mass is cooled and a solution of 20 grams sulfuric acid in 180 grams of water is added. While this mixture is constantly stirred at 25°–30° C. 48 grams furfuraldehyde is run in over a period of one hour and the reaction continued at this temperature for a further period of 48 hours with intermittent stirring.

The resulting product may be purified as in Example #1 or the calculated amount of lime may be added to precipitate the excess sulfuric acid which, after filtration, leaves the new material in the solution.

The use of other condensing agents such as chlorosulphonic acid in place of sulfuric acid for sulfonation of the naphthalene is also possible.

Having now illustrated how my invention is carried into effect I claim:—

1. As new compounds the furfuraldehyde condensation compounds of the sulphonic acids of aromatic hydrocarbons.

2. As new compounds the furfuraldehyde condensation compounds of the sulphonic acids of naphthalene.

3. The process of making furfuraldehyde compounds of sulphonic acids of aromatic hydrocarbons by sulfonating the hydrocarbon and condensing, under mild conditions in presence of sulfuric acid, with furfuraldehyde.

4. As new compounds the furfuraldehyde condensation compounds of the sulphonic acids of a member of the group consisting of naphthalene and homologues of naphthalene.

In testimony whereof I have hereunto set my hand.

IAN C. SOMERVILLE.